US008692422B2

(12) United States Patent
Al Otaibi

(10) Patent No.: US 8,692,422 B2
(45) Date of Patent: Apr. 8, 2014

(54) SPRING-LESS BURIED MAGNET LINEAR-RESONANT MOTOR

(75) Inventor: Zaid Al Otaibi, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 493 days.

(21) Appl. No.: 13/027,719

(22) Filed: Feb. 15, 2011

(65) Prior Publication Data

US 2012/0207628 A1    Aug. 16, 2012

(51) Int. Cl.
*H02K 33/00* (2006.01)
(52) U.S. Cl.
USPC .......................................... 310/15; 310/12.14
(58) Field of Classification Search
USPC .................. 310/15, 30, 33, 36–37, 12.14
See application file for complete search history.

(56) References Cited

U.S. PATENT DOCUMENTS

| 4,827,163 | A | * | 5/1989 | Bhate et al. ..................... 310/15 |
| 4,937,481 | A | * | 6/1990 | Vitale ............................. 310/15 |
| 4,945,269 | A | * | 7/1990 | Kamm ............................ 310/15 |
| 5,693,991 | A | | 12/1997 | Hiterer et al. |
| 5,903,069 | A | | 5/1999 | Hiterer |
| 5,907,201 | A | | 5/1999 | Hiterer et al. |
| 6,157,100 | A | * | 12/2000 | Mielke ............................. 310/13 |
| 6,538,349 | B1 | | 3/2003 | Lee et al. |
| 7,242,118 | B2 | | 7/2007 | Sakamoto |
| 7,474,018 | B2 | | 1/2009 | Shimizu et al. |
| 2002/0175570 | A1 | * | 11/2002 | Redlich ............................ 310/15 |
| 2007/0108850 | A1 | * | 5/2007 | Chertok ........................... 310/15 |

FOREIGN PATENT DOCUMENTS

WO    WO-99/10687    3/1999

OTHER PUBLICATIONS

Jack et al., "Alternative Designs for Oscillating . . . Composites", ICEMS 2006, 6 pages.
Jang et al., "Armature Field Analysis and . . . Reciprocation", IEEE 2001, pp. 406-412.
Wang et al., "Characteristics of linear compressors under current source excitation", Proc. IMechE vol. 221, Part A: J Power and Energy, 2007, Abstract only.
Rajanathan et al., "Design and Control of an Electromagnetic . . . Springs", IEEE Transactions on Energy Conversion, vol. 14, No. 3, Sep. 1999, pp. 643-648.
Al Otaibi, "Single Phase Permanent . . . Applications", PhD Thesis, Newcastle University, 2009, 196 pages.
Notice of Allowance for related U.S. Appl. No. 14/034,765 dated Jan. 29, 2014, 9 pages.

* cited by examiner

*Primary Examiner* — Thanh Lam
(74) *Attorney, Agent, or Firm* — Andrew M. Calderon; Roberts Mlotkowski Safran & Cole, P.C.

(57) ABSTRACT

A spring-less buried magnet linear-resonant motor is provided. The motor includes a buried magnet system and a stator operable to produce an alternating magnetic field exerting alternating axial forces on the buried magnet system that has a self-centering force and a required stiffness to reciprocate at a frequency near an alternating current (AC) supply frequency.

18 Claims, 6 Drawing Sheets

US 8,692,422 B2

SPRING-LESS BURIED MAGNET LINEAR-RESONANT MOTOR

FIELD OF THE INVENTION

The invention relates to a motor and, more particularly, to a spring-less buried magnet linear-resonant motor.

BACKGROUND OF THE INVENTION

Reciprocating piston compressors are commonly used in domestic refrigerators and freezers. In current piston compressors, two bearings in a crank mechanism are used to drive a piston. This moving mass of a piston compressor requires springs to make a motor of the piston compressor resonant at a frequency near an alternating current (AC) supply frequency.

However, these mechanical springs increase a moving mass of the piston compressor and make the piston compressor more complex. For example, the springs may present numerous design problems, be difficult to adjust, intensify mechanical wear, and increase acoustic noise of the piston compressor.

Accordingly, there exists a need in the art to overcome the deficiencies and limitations described hereinabove.

SUMMARY OF THE INVENTION

In a first aspect of the invention, a motor comprises a buried magnet system and a stator operable to produce an alternating magnetic field exerting alternating axial forces on the buried magnet system that has a self-centering force and a required stiffness to reciprocate at a frequency near an alternating current (AC) supply frequency.

In another aspect of the invention, a compressor comprises a buried magnet system and at least one stator operable to produce an alternating magnetic field exerting alternating axial forces on the buried magnet system that has a self-centering force and a required stiffness to reciprocate at a frequency near an alternating current (AC) supply frequency. The compressor further comprises a piston assembly placed through a hole of the buried magnet system and operatively connected to the buried magnet system. The reciprocating of the buried magnet system causes reciprocation of the piston assembly within a cylinder to create oscillating pressure within the cylinder.

In yet another aspect of the invention, a motor comprises a buried magnet system comprising washer-shaped magnets that are axially-magnetized and positioned between washer-shaped iron pieces. The motor further comprises at least one stator comprising stator teeth and a coil operable to produce an alternating magnetic field exerting alternating axial forces on the buried magnet system that has a self-centering force and a required stiffness to reciprocate at a frequency near an alternating current (AC) supply frequency. The motor further comprises a piston assembly placed through a hole of the buried magnet system and operatively connected to the buried magnet system. The reciprocating of the buried magnet system causes reciprocation of the piston assembly within a cylinder to create oscillating pressure within the cylinder. The surface length of each of the stator teeth is greater than a sum of a stroke length of the motor and an axial thickness of one of the magnets in the buried magnet system. The buried magnet system is placed at a position with respect to the at least one stator such that the magnets are fully utilized, the magnets leave ends of stator teeth of the at least one stator at a same time, the buried magnet system is fully-aligned with the at least one stator, and each of magnets of the buried magnet system is a same distance away from ends of the stator teeth of the at least one stator.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to a motor and, more particularly, to a spring-less buried magnet linear-resonant motor. More specifically, the present invention is directed to a motor with magnetic springs, or a spring-less motor, that drives a piston of a compressor, for example. The spring-less motor eliminates the need for bearings of a crank mechanism and complex springs conventionally used in the piston compressor.

In implementing the present invention, the spring-less motor includes a buried magnet system having a significant, linear centering force and a high enough stiffness which acts as a spring with a certain stiffness to drive a piston a specific stroke length and to enable the spring-less motor to be resonant at a frequency near an AC supply frequency. That is, the magnet system has a self-centering force as it moves through its entire reciprocating cycle, as measured from a center point. For example, the magnet system has a same or approximately a same magnetic force as it moves away from a stator (e.g., the center point of the stator) and towards the stator. In this way, the spring-less buried magnet has a linear magnetic force throughout its reciprocating movement, to and away from the stator as measured from its center point. This is accomplished by designing the buried magnet system with specific dimensions and geometries. Further, to allow for the spring-less buried magnet motor to be linear-resonant, the buried magnet system is placed at a position with respect to the stator such that both magnets of the buried magnet system are fully utilized and leave the stator at a same time.

Figure 1A:
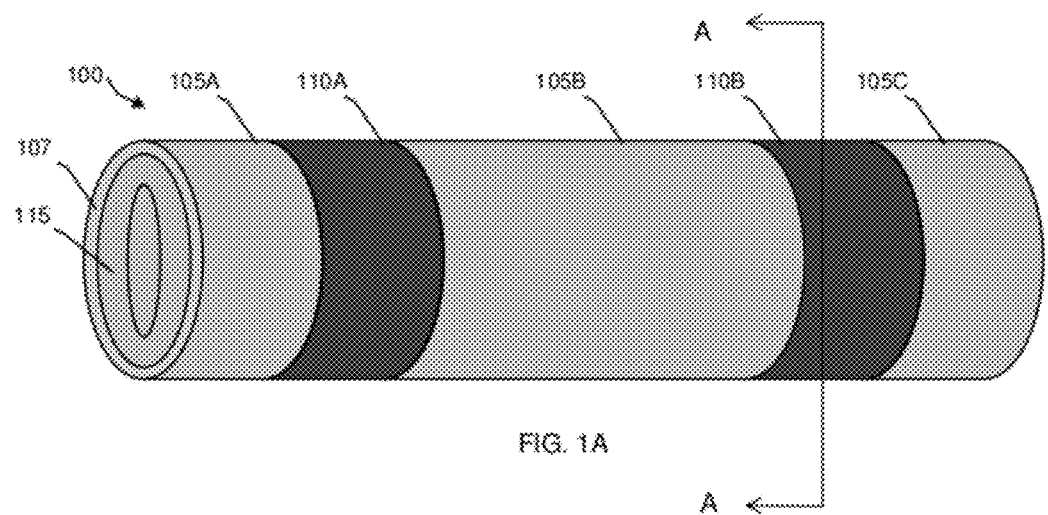
FIG. 1A shows a perspective view of a buried magnet system for use in a spring-less linear-resonant motor in accordance with aspects of the invention.

FIG. 1A shows a perspective view of a buried magnet system 100 for use in a spring-less linear-resonant motor in accordance with aspects of the invention. The buried magnet system 100 includes washer-shaped iron pieces 105A, 105B, and 105C, and washer-shaped magnets 110A and 110B. The washer-shaped iron pieces 105A, 105B, and 105C include a rim portion 107 and a recessed portion 115. In embodiments, the rim portion 107 and the recessed portion 115 can be a tapered wall portion to reduce weight. The iron piece 105B may be larger in size than the iron piece 105A or 105C. Still referring to FIG. 1A, the magnets 110A, 110B are washer shaped magnets which are axially-magnetized (e.g., in a direction of movement) and positioned between the iron pieces 105A, 105B, 105C. This configuration makes the buried magnet system 100 strong enough to move a piston of a motor. More particularly, the magnet 110A is positioned between the iron pieces 105A, 105B, while the magnet 110B is positioned between the iron pieces 105B, 105C.

Figure 1B:
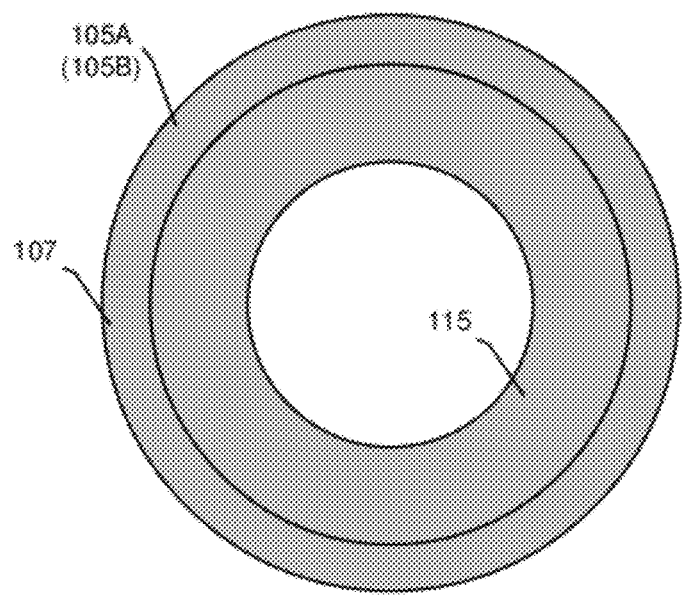
FIG. 1B shows an end view of an iron piece of the buried magnet system in accordance with aspects of the invention.

FIG. 1B shows an end view of an iron piece 105A (e.g., one of iron pieces 105A or 105C) in accordance with aspects of the present invention. In embodiments, the iron piece 105A includes the rim 107 and the recessed portion 115. This configuration beneficially reduces overall weight and space requirements of the buried magnet system 100, for example. The iron piece 105A (and 105B and 105C) may be composed of Soft Magnetic Composites (SMC), although other materials are contemplated in the present invention.

Figure 1C:
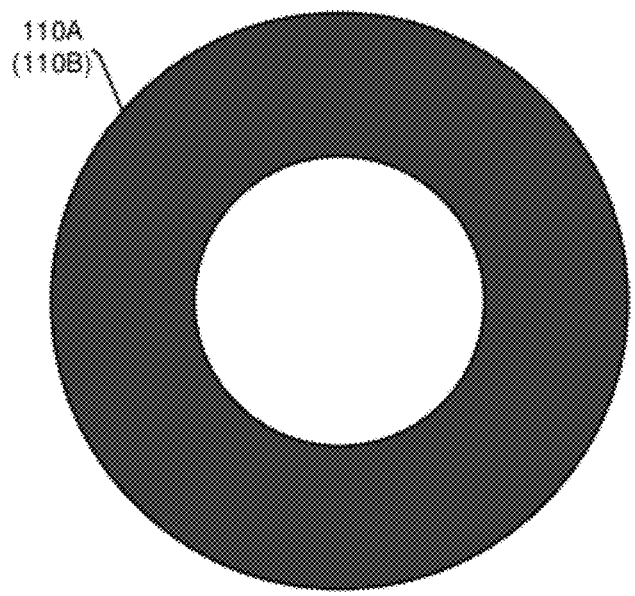
FIG. 1C shows a cross sectional view along line A-A of FIG. 1A, of a magnet of the buried magnet system in accordance with aspects of the invention.

FIG. 1C shows a cross sectional view of the magnet 110A (e.g., or 110B) along line A-A of FIG. 1A. In embodiments, the magnet 110A, 110B may be washer-shaped, which is simpler and less expensive to produce than a cylinder-shaped magnet, for example. The magnet 110A, 110B may be composed of NdFeB, although other materials are contemplated by the present invention.

Figure 2A:
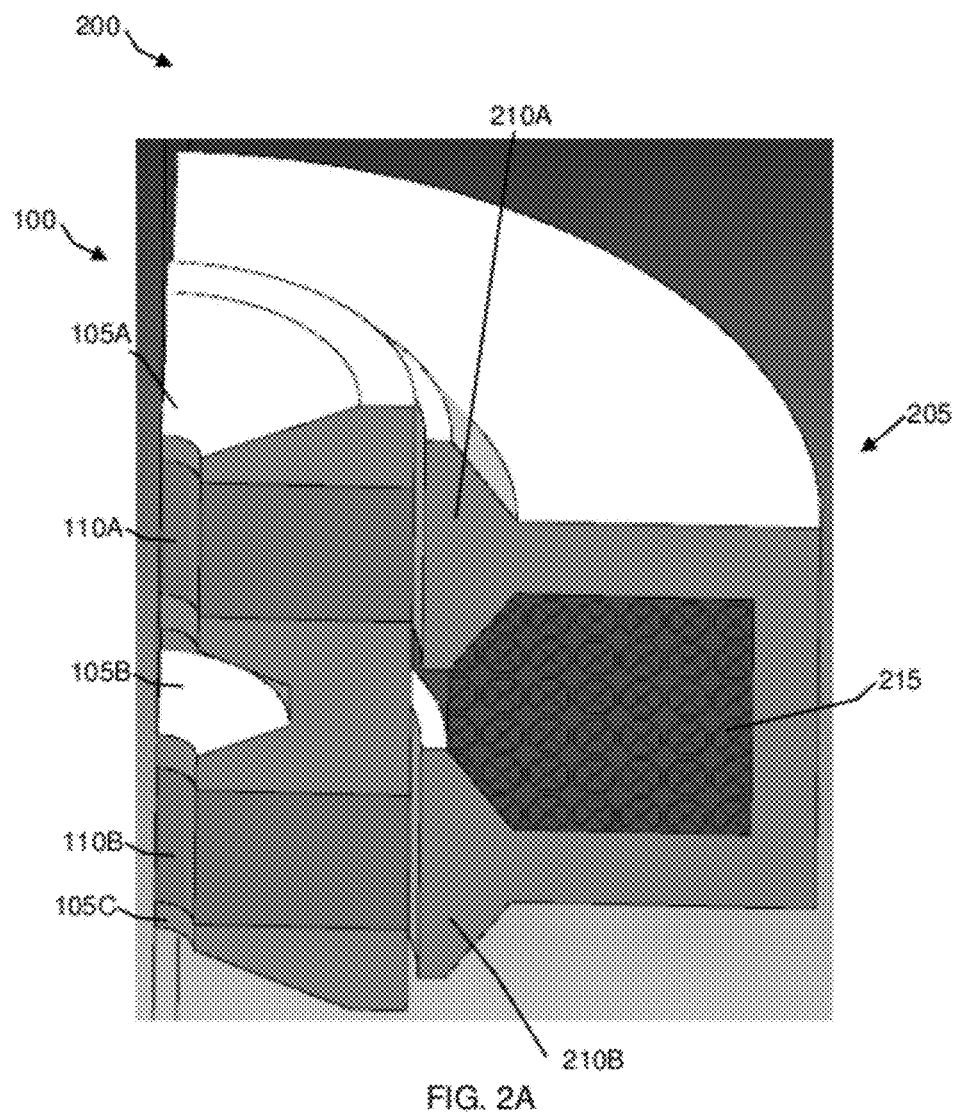
FIG. 2A shows a perspective cross-sectional view of a magnet-stator assembly for use in the spring-less buried magnet linear-resonant motor in accordance with aspects of the invention.

FIG. 2A shows a perspective cross-sectional view of a magnet-stator assembly 200 for use in a spring-less buried magnet linear-resonant motor in accordance with aspects of the invention. In this configuration, one fourth of the magnet-stator assembly 200 is shown. The magnet-stator assembly 200 includes the buried magnet system 100 of FIG. 1A, e.g., shown as one-fourth of the buried magnet system 100 of FIG. 1A and a stator 205 assembly. As discussed with respect to FIG. 1A, the buried magnet system 100 includes the magnets 110A, 110B positioned between the iron pieces 105A, 105B, 105C. In embodiments, the stator 205 may be composed of SMC, although other materials are contemplated in the present invention. In embodiments, the stator 205 includes a coil 215, which may include a conventional bobbin style coil. Ends of the coil 215 are taken out a slot (not shown) formed in a surface of an outside diameter of the stator 205, and connected to an AC supply source.

The magnet-stator assembly 200 further includes the stator 205 operable to produce an alternating magnetic field. The stator 205 can be a conventional stator that includes stator teeth 210A and 210B, and a coil 215. The magnets 110A and 110B are positioned at a same distance from the stator teeth 210A and 210B and, in embodiments, are substantially and/or fully aligned with the respective stator teeth 210A and 210B. In this configuration, a piston can be driven with an optimally small AC power as the buried magnets system 100 (e.g., the magnetic spring) moves at resonance (resonant near an AC supply frequency). Thus, in a piston compressor, for example, only a force necessary to compress a gas or cooling fluid is needed. In operation, when the coil 215 is excited by an alternating current, alternating axial forces are exerted on the buried magnet system 100 thereby causing the buried magnet system 100 to move away from the stator 205 in an axial direction with a force needed to compress the gas or cooling fluid and to return to the stator 205 in an expansion stage. The magnitude of the force acting on the buried magnet system 100 and hence the piston is controlled by the magnitude of input alternating current or voltage. In this way, the buried magnet system 100 reciprocates toward and away from a center point of the stator teeth 210A, 210B, in a linear fashion.

In embodiments, the buried magnet system 100 reciprocates in such a fashion since its magnets 110A, 110B are axially-magnetized, e.g., magnetized in a direction of movement, as well as, for example, is substantially aligned with the stator teeth 210A, 210B.

Figure 2B:
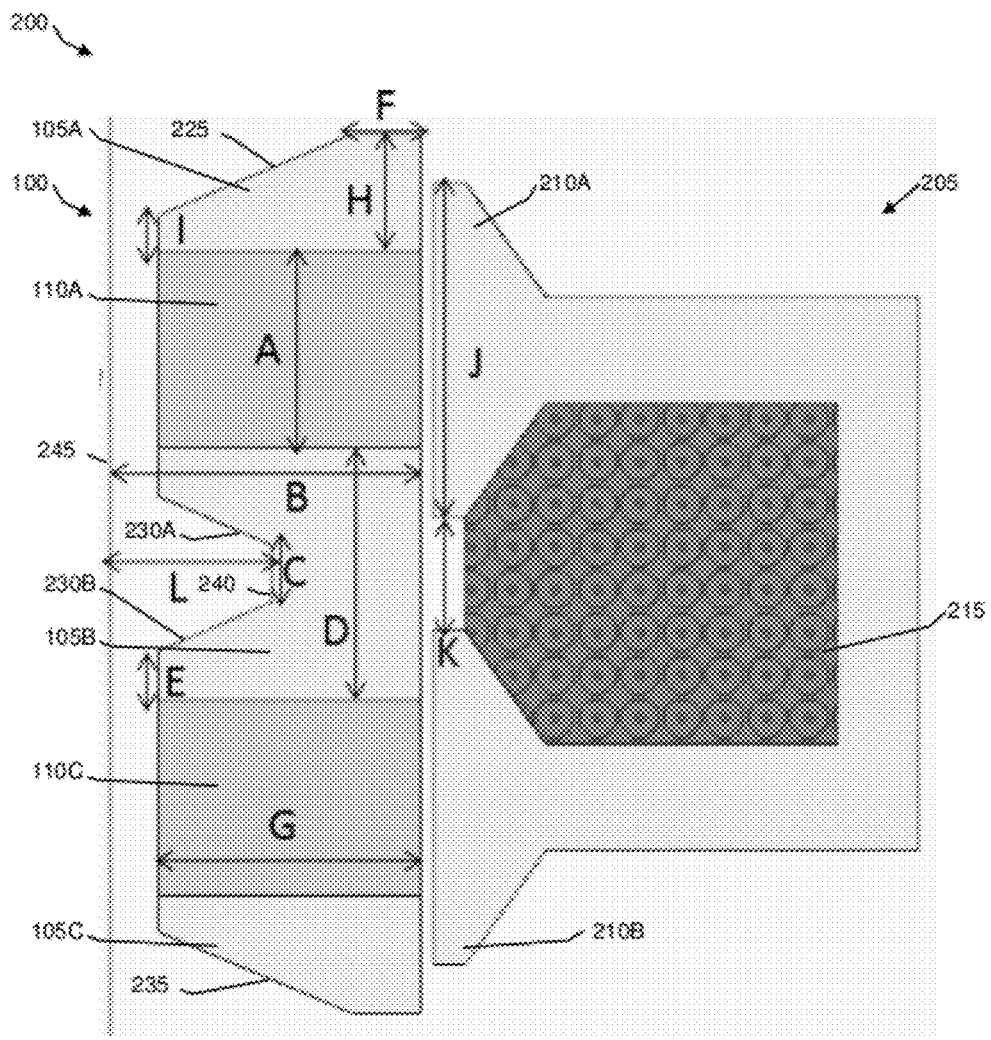
FIG. 2B shows a side cross-sectional view of the magnet-stator assembly in accordance with aspects of the invention.

FIG. 2B shows a side cross-sectional view of the magnet-stator assembly 200. The magnet-stator assembly 200 includes the buried magnet system 100 of FIGS. 1A-1C and 2A. As discussed above, the buried magnet system 100 includes the magnets 110A, 110B positioned between the iron pieces 105A, 105B, 105C. Tapered edges 225, 230A, 230B, and 235 are formed in the iron pieces 105A, 105B, 105C, which beneficially reduces overall weight and space requirements of the buried magnet system 100, for example. The tapered edges 230A, 230B form a cone or conical shape piece 105B and which meets at a bottom surface 240.

The magnet-stator assembly 200 further includes the stator 205 operable to produce an alternating magnetic field. In operation, when the coil 215 is excited by an alternating current, alternating axial forces are exerted on the buried magnet system 100 thereby causing the buried magnet system 100 to move away from the stator 205 in an axial direction (e.g., along a line of symmetry 245) at an alternating force and to return to the stator 205 with the same force based on the alternating current. In this way, the buried magnet system 100 reciprocates toward and away from the center point of the stator teeth 210A, 210B, in a linear fashion.

In illustrative embodiments, both the buried magnet system 100 and the stator 205 are provided with certain dimensions and geometries to enable the motor to drive a piston a specified stroke length with the required force to drive a certain load and to be resonant at a frequency near an AC supply frequency. The following specific dimensions are provided for a specific case dimension of an 8 millimeter (mm) stroke length; however, it should be understood that other stroke lengths and cases can use the same design philosophy. To operate the motor with the stroke length of 8 mm, the magnets 110A, 110B may each include an axial thickness A of 12 mm and a cross-sectional length G of 16.2 mm. A distance B between a surface of the buried magnet system 100 facing the stator 205 and the line of symmetry 245 may be 19.2 mm.

In embodiments, a distance C of the bottom surface 240 in the iron piece 105B may be 3.5 mm. A cross-sectional width D of the iron piece 105B may be 15.5 mm. A distance E between a top of the tapered edge 230A or 230B and the magnet 110A or 110B, respectively, may be 3 mm. A distance F between the surface of the buried magnet system 100, facing the stator 205, and a bottom of the tapered edge 225 or 235, may be 4.2 mm.

In embodiments, a distance H between the magnet 110A or 110B and the bottom of the tapered edge 225 or 235, respectively, may be 7.25 mm. A distance I between a top of the tapered edge 225 or 235 and the magnet 110A or 110B, respectively, may be 2.25 mm. A distance L between the bottom surface 240 in the iron piece 105B and the line of symmetry 245 may be 10 mm.

In embodiments, with respect to the stator 205, the stator teeth 210A, 210B may each include a surface length J of 20.5 mm. The surface length J is designed to be larger than a sum of the stroke length and the cross-sectional magnet width A. In this case, the surface length J is 20.5 mm, which is larger than the sum of the stroke length (8 mm) and the magnet width A (12 mm), i.e., 20 mm. An air gap between the stator 205 and the buried magnet system 100 may be at a distance of 0.8 mm, and a gap between the stator teeth 210A, 210B may be at a distance K of 7 mm. The above specific dimensions are provided for a specific case dimension of an 8 mm stroke length, but it should be understood that different stroke lengths can be used with different dimensions using the same design considerations.

The buried magnet system 100 is placed at a position with respect to the stator 205 such that both of the magnets 110A, 110B are fully utilized and leave both ends of the stator teeth 210A, 210B at a same time, e.g., the magnets 110A, 110B are at a same distance from the respective stator teeth during the reciprocating movement. For example, in embodiments, the buried magnet system 100 may be fully-aligned with the stator 205, and each of the magnets 110A, 110B may be a same distance (e.g., a half stroke length) away from ends of the stator teeth 210A, 210B. These positioning requirements along with the specific dimensions and geometries of the magnet-stator assembly 200 allow the motor to have a self-centering force along the entire specified stroke, to provide a required magnetic spring stiffness, and to be resonant near an AC supply frequency.

Figure 3:
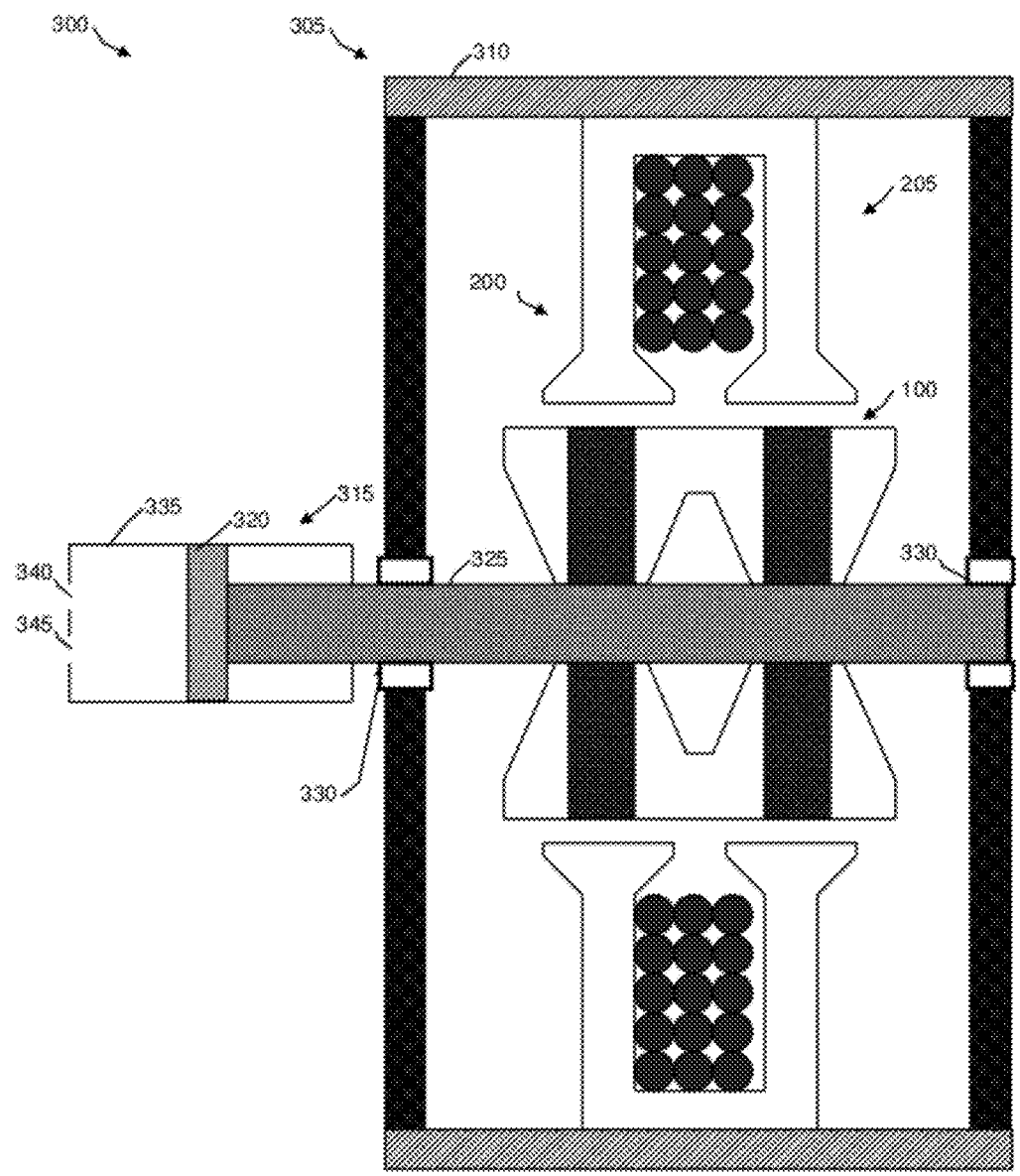
FIG. 3 shows a side cross-sectional view of a piston compressor including the spring-less buried magnet linear-resonant motor in accordance with aspects of the invention.

FIG. 3 shows a side cross-sectional view of a piston compressor 300 including a spring-less buried magnet linear-resonant motor 305 in accordance with aspects of the invention. In embodiments, the piston compressor 300 may be implemented in a crycooler, an air conditioning unit, a refrigerator, and/or an air pump; although other implementations are also contemplated by the present invention. The motor 305 may include the entire magnet-stator assembly 200. Specifically, the motor 305 may include the entire buried magnet system 100 in FIGS. 1A-1C within a casing 310. The motor 305 may also include the entire stator 205 in FIG. 2A fixed to the casing 310.

In embodiments, the motor 305 may further include a piston assembly 315, which includes a piston 320 integrally formed with a shaft 325. In embodiments, the shaft 325 may be composed of non-magnetic stainless steel to prevent the shaft 325 from being included in the magnetic circuit. The shaft 325 is placed through an opening (central hole) of the buried magnet system 100, and is connected to the buried magnet system 100. The connection can be any conventional connection such as, for example, welding, bonding, friction fitting, etc. In embodiments, the shaft 325 may reciprocate on a linear bearing 330.

The compressor 300 further includes a cylinder 335 that includes an inlet valve 340 and a discharge valve 345. In embodiments, the piston 320 is slidable within a portion of the cylinder 335. When the piston 320 is reciprocating within the cylinder 335, oscillating pressure at an end of the cylinder 335 is created and flows out of the compressor 300 through the discharge valve 345.

When excited by an alternating current, the stator 205 exerts alternating axial forces on the buried magnet system 100 to cause the buried magnet system 100 to move away from the stator 205 in an axial direction toward the linear bearing 330 near the cylinder 335 of the motor 305. The buried magnet system 100 has a large enough self-centering force to eliminate the need for mechanical springs to make the buried magnet system 100 resonate at a frequency near the AC supply frequency. The buried magnet system 100 then reciprocates or returns to the stator 205 (e.g., a center point of the stator 205) based on the alternating current. This reciprocating motion causes reciprocation of the connected piston assembly 315 in the compressor 300. In embodiments, the linear bearing 330 of the motor is operable to support the buried magnet system 100 connected to the piston assembly 315, and is anchored to the casing 310. Also, the linear bearing 330 and the shaft 325 will ensure that the buried magnet system 100 remains centered in a bore of the stator 205.

The design of the present invention could adjust a mover mass (e.g., a mass of the buried magnet system 100 and the piston assembly 315) to work at a resonant frequency of an AC supply frequency. For example, to make the motor be resonant at approximately 41 hertz (Hz), a mover mass may be approximately 0.626 kilograms (kg). In embodiments, a mass of the buried magnet system 100 may be approximately 0.4 kg, while a mass of the piston assembly 315 may be approximately 0.226 kg.

Figure 4:
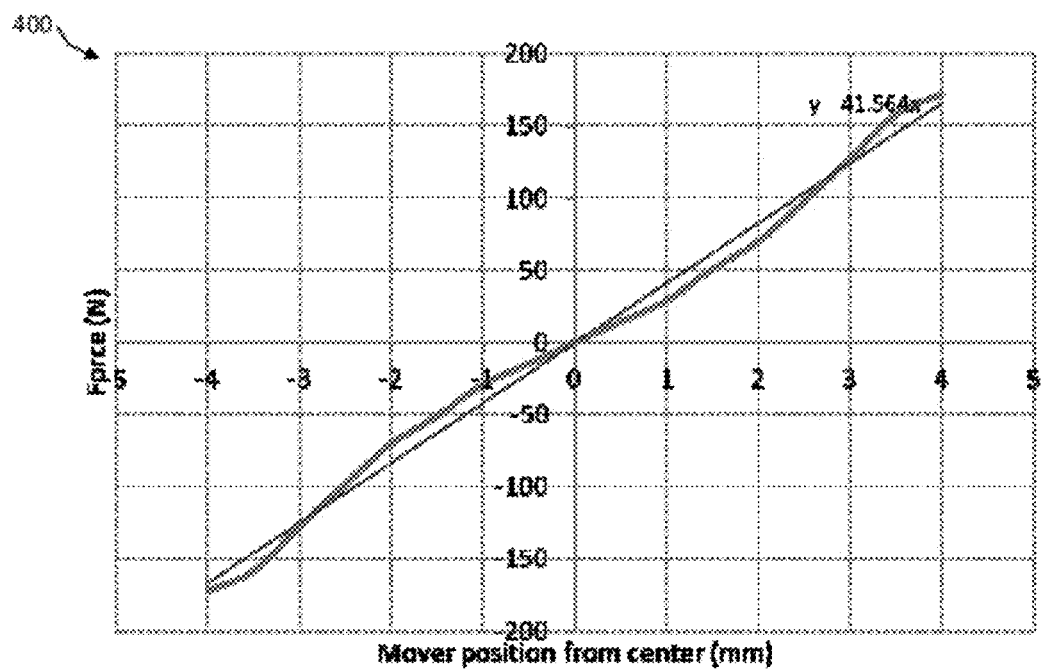
FIG. 4 shows a graph of a centering force of the spring-less buried magnet linear-resonant motor in accordance with aspects of the invention.

FIG. 4 shows a graph of a centering force of a spring-less buried magnet linear-resonant motor when moving the system mechanically with zero input current, such as the spring-less buried magnet linear resonant motor 305 in FIG. 3, in accordance with aspects of the invention. The centering force is along the y-axis and is in units of newtons (N), and a position of a mover (e.g., the buried magnet system 100 in FIG. 3) is along the x-axis and is in units of mm. As shown in FIG. 4, according to initial simulations, the spring-less buried magnet linear resonant motor 305 of the present invention will have a linear force with regard to movement away from its static point, e.g., center point, in both directions. That is, the spring-less buried magnet linear resonant motor 305 will have a force of approximately −150 N at −4 mm (e.g., a distance toward the linear bearing 330 near the cylinder 335); likewise, the spring-less buried magnet linear resonant motor 305 will have a force of approximately 150 N at 4 mm (e.g., a distance toward the stator 205). In this way, the spring-less buried magnet linear resonant motor 305 will generate a linear force throughout is reciprocating movement, to and away from the stator as measured from its center point.

A mechanical system of the motor can be modeled as a mass-spring system. Therefore, the mechanical behavior of the motor can be presented by the following equation:

$$M\frac{d^2x}{dt^2} + D\frac{dx}{dt} + Kx = F_m, \tag{1}$$

where M represents a moving mass of the motor (e.g., a mass of the buried magnet system 100 and the piston assembly 315 in FIG. 3), D represents a mechanical damping coefficient, K represents a spring stiffness of a buried magnet system of the motor, x represents an instantaneous displacement of the buried magnet system of the motor, and $F_m$ represents a force that the motor should supply to drive a specific load.

If a sinusoidal movement is assumed (e.g., $x=x_p \sin(\omega t)$), the equation (1) can be rewritten as follows:

$$F_m = [(K-M\omega^2)x_p \sin(\omega t) + D\omega x_p \cos(\omega t)]. \tag{2}$$

From the equation (2), the spring stiffness K should equal the moving mass M multiplied by a supply frequency squared $\omega^2$ for the motor to supply a minimum force $F_m$ and to work at a resonant frequency of the supply frequency. Therefore, the design of the present invention could adjust the centering force (or the spring stiffness K) and the mover mass M to work at a resonant frequency of the supply frequency. For example, as shown in FIG. 4, at no-load operation the self-centering force stiffness K (e.g., the slope of the line) being approximately 41.564 N/mm, and the mover mass M is approximately 0.626 kg, which makes the motor resonant at approximately 41 Hz. In embodiments, a mass of a buried magnet system may be approximately 0.4 kg, while a mass of a piston assembly may be approximately 0.226 kg.

In embodiments, for gas compression, the mechanical system of the motor can be modeled so the spring stiffness K will be larger when the motor is loaded in a compressor. For example, a standalone motor may be designed to resonate at approximately 41 Hz, but when the motor is placed in a compressor to drive the compressor, such a system may be designed to resonate at approximately 50 Hz.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A motor, comprising:
   a buried magnet system; and
   a stator operable to produce an alternating magnetic field exerting alternating axial forces on the buried magnet system that has a self-centering force to act as a spring with a required stiffness to reciprocate at a frequency near an alternating current (AC) supply frequency,
   wherein a surface length of each of the stator teeth is greater than a sum of a stroke length of the motor and an axial thickness of a magnet in the buried magnet system.

2. The motor of claim 1, wherein the buried magnet system comprises washer-shaped magnets that are axially-magnetized and positioned between washer-shaped iron pieces.

3. The motor of claim 1, wherein the stator comprises stator teeth and a coil operable to produce the alternating magnetic field.

4. The motor of claim 1, wherein the buried magnet system is placed at a position with respect to the stator such that magnets of the buried magnet system are fully utilized.

5. The motor of claim 1, wherein the buried magnet system is placed at a position with respect to the stator such that magnets of the buried magnet system leave ends of stator teeth of the stator at a same time.

6. The motor of claim 1, wherein the buried magnet system is placed at a position with respect to the stator such that the buried magnet system is aligned with the stator.

7. The motor of claim 6, wherein the buried magnet system is placed at a position with respect to the stator such that washer-shaped magnets that are axially-magnetized and positioned between washer-shaped iron pieces are aligned with stator teeth of the stator.

8. The motor of claim 1, wherein the buried magnet system is placed at a position with respect to the stator such that each of magnets of the buried magnet system is at a same distance away from ends of stator teeth of the stator.

9. The motor of claim 1, wherein a magnetic spring stiffness of the motor equals a moving mass of the motor multiplied by the supply frequency squared for the motor to supply a minimum force by working at a resonant frequency of the supply frequency.

10. The motor of claim 1, further comprising a piston assembly placed through a hole of the buried magnet system and operatively connected to the buried magnet system, wherein the reciprocating of the buried magnet system causes reciprocation of the piston assembly.

11. The motor of claim 1, wherein the buried magnet system has a self-centering force as it moves through its entire reciprocating cycle, as measured from a center point.

12. The motor of claim 11, wherein the self-centering force vs. position distance from center has substantially a constant slope as it moves away from a center and towards the stator.

13. The motor of claim 1, wherein:
   the buried magnet system comprises two washer-shaped magnets with three washer-shaped iron pieces;
   one of the three washer-shaped iron pieces is sandwiched between first ends of the two washer-shaped magnets and two of the three washer-shaped iron pieces are adjoining second ends of each of the two washer-shaped magnets; and
   the two of the three washer-shaped iron pieces have free ends, not adjoining any magnets.

14. The motor of claim 13, wherein the washer-shaped iron pieces each include a rim portion and a recessed portion resulting from shaping the pieces to reduce the moving mass.

15. The motor of claim 14, wherein the rim portion and the recessed portion are a tapered wall portion resulting from shaping the pieces to reduce the moving mass.

16. The motor of claim 15, wherein the washer-shaped iron piece sandwiched between the first ends of the two washer-shaped magnets is larger than the two of the three washer-shaped iron pieces.

17. The motor of claim 16, wherein the two washer-shaped magnets are fully aligned with respective stator teeth of the stator.

18. The motor of claim 1, wherein the stator is a single stator and further comprising a single mover and a single airgap.

* * * * *